July 20, 1965 W. H. ARMSTRONG ETAL 3,195,153
BED RESTRAINING SIDES
Filed Sept. 20, 1962 2 Sheets-Sheet 1
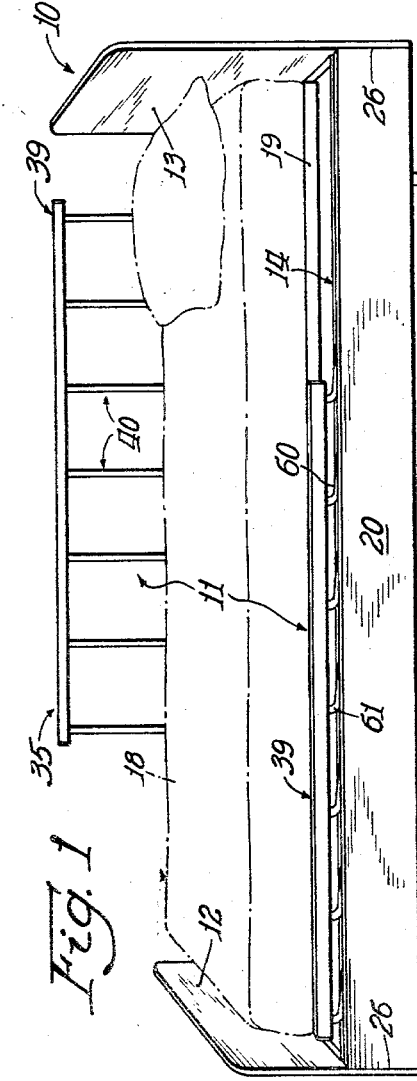
Inventors:
William H. Armstrong
and Martin M. Linder
By: Evan D. Roberts
Atty

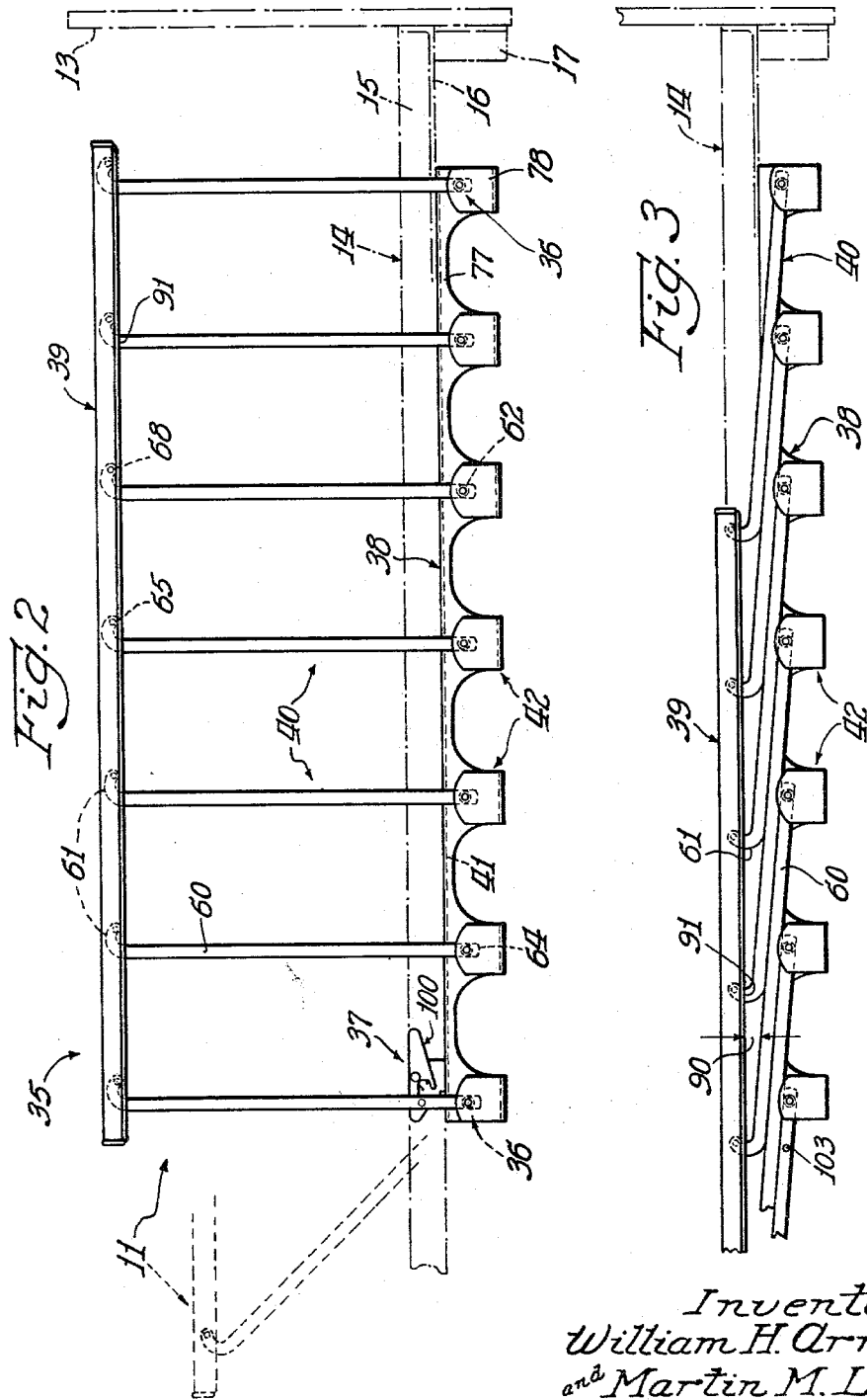

United States Patent Office 3,195,153
Patented July 20, 1965

3,195,153
BED RESTRAINING SIDES
William H. Armstrong, Birmingham, Mich., and Martin M. Linder, Villa Park, Ill., assignors to Borg-Warner Corporation, Chicago, Ill., a corporation of Illinois
Filed Sept. 20, 1962, Ser. No. 224,907
6 Claims. (Cl. 5—331)

This invention relates to a restraining side for a bed and more particularly to an improved adjustably collapsible restraining side for a bed.

In the past collapsible or foldable restraining sides have been provided for hospital beds and the like. Such restraining sides have been provided in one way or another with various means for holding the restraining sides in the upright position and may be released to allow the restraining side to fold or collapse. However, the known types of restraining sides do not provide an easily operated positive latching structure for retaining the restraining sides in the upright position, and further, do not provide any structure for positioning the restraining side in any position between the upright and collapsed position.

Further, none of the known types of bed restraining sides provide adequate lateral stability with respect to the bed while maintaining a narrow over-all bed width and a small restraining side silhouette when collapsed. Also, although some types of known restraining sides are provided with a structure that alleviates some of the hazard of pinching the hand of the person manipulating the restraining side, the known structures still possess a sizable area adjacent the pivotal connections of the various elements thereof where it is possible for the individual manipulating the restraining side to pinch his hand.

It is, therefore, extremely important to be able to provide a foldable or collapsible bed restraining side that may be easily, yet releasably, locked in the upright position, that may be positioned in an infinite number of positions between the upright position and the collapsed position, and that possesses increased lateral stability over known types of restraining sides. Further, it is extremely important to be able to provide such a restraining side and yet provide a restraining side that has a narrow width, minimum surface hand pinching area adjacent the pivotal connection between the elements of the restraining side, and that has a small compact silhouette when collapsed.

It is a primary object of this invention to provide a bed restraining side of relatively simple and economical construction that may be positionally folded or collapsed to provide access to the bed.

Another object of this invention resides in a bed restraining side having a latching means for rigidly locking the restraining side in a pre-selected position independent of the head and foot boards of the bed upon which the restraining side is utilized.

A further object of this invention is to provide a bed restraining side having a friction positioning structure effective on the restraining side at the base thereof for retaining the restraining side in any number of partially collapsed positions.

Another object of this invention is to provide a bed restraining side having a supporting structure for pivotally mounting the restraining side on the side rail of the bed and for providing improved lateral stability for the pivotally mounted restraining side.

Still another object of this invention is to provide a bed restraining side that is pivotally foldable or collapsible and that provides a relatively narrow bed structure.

A further object of this invention is to provide a bed restraining side that is foldable or collapsible and that provides a nominal sized silhouette when collapsed.

An additional object of this invention is to provide a bed restraining side that is foldable or collapsible and that is so constructed as to have a minimum hand pinching area adjacent the pivotally interconnected elements of the restraining side.

With these and other objects in view the present invention contemplates a collapsible side for beds having a side rail wherein the restraining side includes a bottom rail, a top rail, and connecting bars that pivotally interconnect the top and bottom rails to allow the restraining side to pivotally collapse toward the bottom rail; and wherein the restraining side is provided with a structure for positioning the restraining side in a selected partial or fully collapsed position.

Other objects, advantages, and novel aspects of the invention will become apparent upon consideration of the following detailed description, in conjunction with the accompanying drawings wherein:

FIG. 1 is a perspective view of a bed showing the upright and collapsed position of the restraining side.

FIG. 2 is a side elevation view of the restraining side showing the pivotal action of the restraining side when collapsed.

FIG. 3 is a side elevation view of the restraining side showing the restraining side in the collapsed position.

FIG. 4 is a partial view of the restraining side showing the position of the latch mechanism with the restraining side in the raised position.

FIG. 5 is a partial sectional view taken along line 5—5 of FIG. 4 showing the interrelationship of the latch mechanism, the friction positioning mechanism and the remaining elements of the bed restraining side.

Referring to the drawings, there is illustrated a hospital bed generally designated by the numeral 10 with Applicants' collapsible restraining sides 11 operatively mounted on opposite sides thereof. Each of the bed restraining sides 11 is an exact structural image of the other and, therefore, only the left (FIG. 5) restraining side will be described in basic detail and it is to be understood that the description applies equally to both restraining sides 11.

The bed 10 includes generally a foot board 12 and a head board 13 (FIG. 1) rigidly interconnected by a pair of opposed L-shaped side rails 14 having a vertical portion 15 (FIGS. 4 and 5) and a horizontal portion 16. The side rails 14 are supported on corner brackets 17 secured to the head and foot boards 13 and 12. The bedding 18 and mattress springs 19 may be supported by conventional means (not shown) on the side rails 14. A bed side panel 20 is secured to each side of the bed on spacing tubes 21 by pairs of screws 22 inserted in openings 23 in the side rails 14 and in the corner brackets 17 (FIG. 5) through passages 24 in the spacing tubes 21 and threaded into apertures 25 in the side panel. The side panel supported in this manner on the side rails 14 substantially flush with edges 26 of the head and foot boards 13 and 12 and spaced from the side rails 14 and corner brackets 17 to allow Applicants' restraining sides to be laterally positioned therebetween.

The restraining sides 11 include generally a collapsible side panel 35, a friction holding assembly 36, and a latch assembly 37. The panel 35 includes a bottom support rail 38, a top hand rail assembly 39 and a series of spaced connecting bars 40. The bottom rail 38 has a solid horizontal flange portion 41 and a series of spaced apart, downwardly extending, U-shaped portions 42 for respectively supporting the connecting bars 40. The bottom rail 38 may be formed as part of the side rail 14 but for purposes of illustration the bottom rail is shown as a separate piece 38 secured to the horizontal portion 16 of the side rail 14 by screw assemblies 43 (FIG. 5).

The top rail assembly 39 includes generally a top rail 50 and a rail cover 51 (FIG. 5). The top rail 50 has a U-shaped cross-section with inwardly extending longitudinal thickened portions 52 on the lower extremities of the top 50. The top rail 50 is also provided with outwardly opening longitudinal grooves or recesses 53 adapted to longitudinal projections 54 of the rail cover 51 to retain the rail cover 51 on the top rail 50. The rail cover 51 may be made of plastic, metal, or other material having sufficient resiliency to allow the projections 54 of the cover 51 to be spread apart to allow the rail cover 51 to be slipped over the top rail 50 and snapped in position on the top rail 50 with the rail cover projections 54 fitting into the grooves 53 in the top rail 50 and thereby retaining the rail cover 51 on the top rail.

The connecting bars 40 include generally a straight bar body portion 60 (FIG. 2) and a curved upper end portion 61 extending laterally from the body portion 60. A lower passage 62 (FIG. 5) is provided in each connecting bar body 60 a distance 63 (FIG. 4) from a bottom end 64 of the bar 40 and an upper passage 65 (FIG. 5) is provided in the laterally extending arcuate upper portion 61 of the connecting bars 40. The connecting bar body portions 60 and the respective arcuate end portions 61 have substantially the same thickness $t$ (FIGS. 2 and 4) and are provided with a similar width $w$ for the entire length of the bar 40 (FIG. 5). The connecting bars 40 are arranged in parallel relation to each other (FIGS. 1 and 2) with the arcuate end portions 61 positioned within the U-shaped top rail 50 and with the bottom length 63 thereof between the outer and inner surfaces 66 and 67 respectively of the U-shaped extension of the bottom rail 42 (FIG. 5). The arcuate end portions 61 of all the bars 40 extend in a single direction in the general direction of the head board 13 (FIG. 2) and are pivotally connected with the top rail by a pin 68 inserted in the passage 65 in curved portions 61 and that extends into passages 69 in the sides of the top rail 50.

The connecting bars 40 are pivotally mounted on respective bearing spacers 75 (FIG. 5). The bearing spacers 75 are positioned between respective apertures 76 in inner segments 77 of the U-shaped portion 42 of the bottom rail 38 and extend into abutting engagement with the outer surfaces 66 of the outer segment 78 of the U-shaped portion 42 of bottom rail 38. The spacer bearings 75 are held in position by respective screw assemblies 79 inserted in the apertures 76.

Inasmuch as the connecting bars 40 are pivotally secured to the bottom rail 38 and the top rail 50 as above described, the bottom rail 38, top rail 50, and connecting bars 40 form the bed side panel 35 that is pivotally collapsible about the screw assemblies 79 toward the bottom rail 38 (FIG. 2) and may be completely collapsed downwardly in a scissor-like fashion toward the bottom rail 38 (FIG. 3). When the panel 35 is thus collapsed (FIG. 3) the arcuate connecting bar end portions 61 provide a distance 90 between the pivot pin 79 and the connecting bar body 60 so that fingers of the patient or other person collapsing the bed will not be pinched by the scissor action of the top rail 50 and the connecting bar body 60 during the collapsing of the restraining side panel 35.

A collapsible restraining side structure whereby the connecting bars are provided with an arcuate end portion for preventing pinching of the operator's fingers is not new. However, known types of restraining sides provide arcuate ends on each end of the connecting bars and thus when the side panels are collapsed the arcuate end on the bottom of the connecting bar adds an additional height to the collapsed restraining side equal to the distance 90 to double the length added to the silhouette of the restraining side in the collapsed position. Contrary to this, Applicants' connecting bars 40 are each provided with an arcuate end portion 61 on the upper end of the bars 40 where the patient's or other person's hand is most likely to be pinched and the bottom portion of the adjacent connecting bar is free to collapse one on the other to a lower position (FIG. 3). Thus Applicants provide a novel structure whereby a smaller restraining side silhouette is provided when the restraining side is collapsed and thereby provide a freer access to the bed 10.

Further, known types of restraining sides having connecting bars with arcuate end portions merely utilize a flat top rail to which the upper arcuate connecting bar portions are laterally pivotally secured. Under these circumstances, the arcuate end portion pivotally secured to the flat top rail has an edge around the entire periphery of the arcuate end portion thereby providing a structural arrangement in conjunction with the flat top rail whereby a person collapsing the hand rail could pinch their skin along that edge between the arcuate portions of the connecting bars and the flat surface top rail.

Applicants' improved structure provides a top rail 50 that encloses the greater portion of the arcuate end portion 60 of the connecting bars 40 and presents only a small edge 91 (FIGS. 2 and 5) along the top rail 50 that might be capable of pinching the skin of an operator collapsing the restraining side. Applicants' edge 91 thus provided, however, is positioned considerably inward from the top rail cover 51 and is practically inaccessible to a person collapsing the panel 35. Applicants' above described novel panel structure 35 all but completely removes the danger of pinching the operator's skin between the top rail and the connecting bars during the collapsing of the restraining sides of this general type.

The connecting bars 40 are laterally positioned on the respective spacer bearings 75 by washers 95 (FIG. 5) positioned on one or more of the spacer bearings and by a resilient compressible washer 96 which could be a Belleville washer (FIG. 5) or a washer made of resilient fiber, resilient rubber or other similar material positioned between two of the washers 95 on the spacer bearings 75 on the inner or right side of the connecting bars 40. The Belleville washer 96 is somewhat compressed in position (FIG. 5) by the limited distance between surfaces 66 and 67 so as to frictionally resist pivotal movement of the bars 40 and thereby hold the panel in any given pivoted position on the bottom rail.

In the event that a lateral force is applied to an upper portion of the panel 35 (FIG. 5) the panel 35 will have a tendency to pivot about the supporting bar spacers 75. In this regard it should be noted that Applicants provide connecting bars 40 having a substantial width $w$ adjacent the bearing spacers 75 so as to provide lateral stability to resist lateral forces applied to an upper portion of the panel 35 that will tend to pivot the panel laterally about the supporting spacers 75.

Further, a patient or other person may apply an extremely severe lateral force to an upper portion of the panel 35 tending to pivot the panel about the bearing spacers 75 to the extent of deforming either the apertures 62 in the connecting bars 40 of the bearing support spacers 75 or both. In this event a lateral pivotal movement of the panel 35 will be limited by the inner surfaces 66 and 67 of the U-shaped portion 42 of the bottom rail 38. In particular, the connecting spacer bars 40 having a lower end 64 extending well into the U-shaped portion 42 would thus be caused to engage either of the surfaces 66 and 67 of the U-shaped portion. Thus pivotal movement of the panel 35 would be confined to a substantially vertical position determined by the size of the portion 42 even under a situation where an extreme lateral force is applied to the upper half of the panel 35.

The latch assembly 37 referred to above and illustrated in detail in FIGS. 4 and 5 holds the restraining side panel 35 in a predetermined rigid upright position (FIG. 2). The latch assembly 37 includes generally a latch 100, a stop bracket 101, a spring 102 and a lock pin 103. The latch 100 is pivotally mounted on a pin 104 and the pin 104 is secured to the bracket 101 by a riveted portion 105 of the pin 104 extended through an aperture 106 in the bracket 101.

The latch 100 is retained on the pin 104 by a friction nut 107. The stop bracket 101 is welded or similarly secured to the bottom rail 14 adjacent the latch 100 (FIG.

4) at 108 and is provided with an outwardly extending latch stop plate portion 109. The spring 102 has one end 110 secured in the stop bracket 101, a body portion 111 extending partially around the latch pivot screw 104 and another end portion 112 in engagement with the latch 100 in a notch 113 in the latch 100.

The spring 102 is biased so as to urge the latch 100 in a counterclockwise direction (FIG. 4) about the pin 104 to tend to urge the latch 100 into engagement with the bracket plate 109. The lock pin 103 is secured to an inner side 116 of the connecting bar 40 adjacent the latch 100 (FIGS. 4 and 5) so that when the restraining side panel 35 is brought to the up position (FIGS. 2, 4, and 5) the lock pin 103 will engage a cam surface 120 on the latch 100 to pivot the latch clockwise (FIG. 4) about the pin 104 to allow the lock pin 103 to pass beneath a projecting portion 121 of the latch 100 and engage a rubber grommet stop 122 inserted in an opening 123 in the bracket plate 109.

In this position (FIG. 4) the lock pin 103 is in engagement with the grommet 122 and the latch 100 will be urged counterclockwise (FIG. 4) by the spring 102 so that the locking pin 103 will be positioned in a locking groove 124 in the latch 100. The latch will thereby retain and prevent the restraining side panel 35 from moving from the vertical position and from pivotally collapsing movement toward the bottom rail 38 by virtue of the latch 100 and the rubber grommet 122 in the stop bracket plate 109. The latch 100 may be pivoted about the latch pin 104 to release the locking pin 103 from the locking groove 124 of the latch 100 by manually applying downward force on an extending portion 125 of the latch 100 to rotate the latch clockwise about the pin 104 against the action of the spring 102.

The bed restraining side 11 above described provides novel structures which provide a collapsible bed restraining side 11 that is releasably locked in the upright position by a novel latch 100 and that is positionable in an infinite number of positions between the upright portion and the collapsible position by virtue of the friction positioning assembly structure 36 that in turn further provides increased lateral stability for the panel 35 over known types of restraining sides by virtue of the pivotal connection between the connecting bars 40 and the bottom rail 14 and that all but completely removes possible handpinching areas present in known types of collapsing restraining sides. Further this invention provides a restraining side 11 having a reduced vertical silhouette when collapsed (FIG. 3) and yet does not greatly increase the overall width of the bed incorporating novel restraining sides.

It is to be understood that the invention is not to be limited to the specific constructions and arrangements shown and described, except only insofar as the claims may be so limited, as it will be understood to those skilled in the art that changes may be made without departing from the principles of the invention.

What is claimed is:

1. A collapsible restraining side for beds having a side rail comprising the combination of a bottom support rail secured to the side rail, a top rail having a longitudinally positioned channel formed in the bottom thereof, connecting bars having straight lower end portions pivotally connected to the bottom rail and arcuate and laterally extended upper end portions pivotally connected to said top rail within the channel formed in said top rail for pivotal positional movement of said bars on said bottom rail to allow said restraining side to be pivotally collapsed downwardly from an upper position toward said bottom rail, and holding means positioned between said bottom rail and one or more of said bars for automatically adjustably retaining said bars in a selected position with respect to said bottom rail to retain said restraining side in a corresponding position.

2. A collapsible restraining side for beds having a side rail comprising the combination of a bottom support rail secured to the side rail, said bottom rail including connecting individual bar supports extending downwardly and longitudinally spaced apart on said bottom rail, said bar supports including two laterally spaced members, a top rail having a longitudinal channel formed in the bottom thereof, connecting bars having straight lower end portions pivotally connected to the top portion of said bar supports between said supports and respectively extending a substantial distance beyond said top portion between said bar supports for facilitating lateral support of said bars and arcuate and laterally extended upper end portions pivotally connected to said top rail within the channel formed in said top rail for pivotal positional movement of said bars on said bottom rail to allow said restraining side to be pivotally collapsed downwardly from an upward position toward said bottom rail.

3. A collapsible restraining side for beds having a side rail comprising the combination of a bottom support rail secured to the side rail, a top rail, connecting bars having arcuate laterally extended upper end portions and straight lower end portions, said bottom rail including connecting bar supports longitudinally spaced on said bottom rail, said bar supports extending downwardly and including two individual laterally spaced apart members, said connecting bars having the lower ends thereof pivotally connected to the top portion of said bar supports between said supports and respectively extending a substantial distance beyond said top portion between said bar supports for facilitating lateral support of said bars and the laterally extended upper end portions thereof pivotally connected to said top rail for pivotal positional movement of said bars on said bottom rails to allow said restraining sides to be pivotally collapsed downwardly from an upper position toward said bottom rail whereby said laterally extended upper ends maintain a minimum distance between the lower extremity of the upper rail and the side of said connecting bar from which the upper end is positioned to provide a clearance therebetween, and a resilient washer positioned on said support bearing between one or more of said connecting bars and said bottom rail in compressed frictional engagement with said one or more bars and said bottom rail for frictionally resisting pivotal movement of said bars toward said bottom rail to retain said bars in a pivotal position with respect to said bottom rail, whereby said restraining side is positioned in a corresponding collapsed position.

4. A collapsible restraining side for beds having a side rail comprising the combination of a bottom support rail secured to the side rail, said bottom rail including individual connecting bar supports extending downwardly and longitudinally spaced apart on said bottom rail, said bar supports including two laterally spaced and upwardly extending side members, a top rail having a longitudinal channel formed in the bottom thereof, connecting bars having arcuate laterally extended upper end portions and straight lower end portions, said connecting bars having the lower ends thereof pivotally connected to the bottom rail and the laterally extended upper end portions thereof positioned within the channel of said top rail and pivotally connected to said top rail for pivotal positional movement of said bars on said bottom rail to allow said restraining sides to be pivotally collapsed downwardly from an upper position toward said bottom rail, whereby said laterally extended upper ends maintain a minimum distance between the lower extremity of the upper rail and the side of said connecting bar from which the upper end is positioned to provide a clearance therebetween, and holding means positioned between said bottom rail and one or more of said bars for automatically retaining said bars in a selected position with respect to said bottom rail to retain said restraining side in a corresponding position.

5. A collapsible restraining side for beds having a side rail comprising the combination of a bottom support rail secured to the side rail and having individual bar support members longitudinally spaced apart and extending downwardly and outwardly, a top rail, connecting bars having arcuate laterally extended upper end portions and straight lower end portions, said connecting bars having the lower ends thereof pivotally connected to the bottom rail supports and the laterally extended upper end portions thereof pivotally connected to said top rail for pivotal positional movement of said bars on said bottom rail to allow said restraining sides to be pivotally collapsed downwardly from an upper position toward said bottom rail, whereby said laterally extended upper ends maintain a minimum distance between the lower extremity of the upper rail and the side of said connecting bar from which the upper end is extended to provide a clearance therebetween, a pin secured to one of said bars, a latch stop secured to the side rail, a resilient stop means mounted on said latch stop for engaging and limiting the movement of said pin to position said restraining side in an up position, a latch pivotally mounted on said side rail, said latch having a projection thereon for engaging said pin when said restraining side is in the up position to retain said restraining side in contact with said resilient stop, spring means for pivotally urging said latch toward said latch stop to position said latch projection in retaining position, a cam surface on said latch for operatively engaging said pin to pivot said latch out of the retaining position, whereby said restraining side may be pivoted into the up position, and a resilient washer positioned on said support bearing between one or more of said connecting bars and said bottom rail in compressed frictional engagement with said one or more bars and said bottom rail for frictionally resisting pivotal movement of said bars toward said bottom rail to retain said bars in a pivotal position with respect to said bottom rail, whereby said restraining side is positioned in a corresponding collapsed position.

6. A collapsible restraining side for beds having a side rail comprising the combination of a bottom support rail secured to the side rail, said bottom rail including individual connecting bar supports longitudinally spaced apart on said bottom support rail, each of said bar supports including two laterally spaced vertical members, a top rail having a longitudinal channel formed in the bottom thereof, connecting bars having arcuate laterally extended upper end portions and straight lower end portions, said connecting bars having the lower ends thereof pivotally connected to the top portion of said bar supports and respectively extending a substantial distance beyond said top portion of said bar supports between said supports for facilitating lateral support of said bars, said laterally extended upper end portions of said bars being pivotally connected to said top rail for pivotal positional movement of said bars on said bottom rail to allow said restraining sides to be pivotally collapsed downwardly from an upper position toward said bottom rail whereby said laterally extended upper ends for maintaining a minimum distance between the lower extremity of the upper rail and the side of said connecting bar from which the upper end is positioned to provide a clearance therebetween, a pin secured to one of said bars, a latch stop secured to the side rail, a resilient stop means mounted on said latch stop for engaging and limiting the movement of said pin to position said restraining side in an up position, a latch pivotally mounted on said side rail, said latch having a projection thereon for engaging said pin when said restraining side is in the up position to retain said restraining side in contact with said resilient stop, spring means for pivotally urging said latch toward said latch stop to position said latch projection in retaining position, a cam surface on said latch for operatively engaging said pin to pivot said latch out of the retaining position, whereby said restraining side may be pivoted into the upright retained position, and a resilient washer positioned on said support bearing between one or more of said connecting bars and said bottom rail in compressed frictional engagement with said one or more bars and said bottom rail for frictionally resisting pivotal movement of said bars toward said bottom rail to retain said bars in a pivotal position with respect to said bottom rail, whereby said restraining side is positioned in a corresponding collapsed position.

References Cited by the Examiner
UNITED STATES PATENTS

| 297,005 | 4/84 | Rall et al. | 292—128 |
|---|---|---|---|
| 598,735 | 2/98 | Megins | 5—331 |
| 1,089,337 | 3/14 | Graham | 248—291 |
| 2,334,610 | 11/43 | Crawford | 248—226.5 |
| 2,799,869 | 7/57 | Leone et al. | 5—331 |
| 2,972,153 | 2/61 | Turk | 5—331 |
| 2,976,548 | 3/61 | Maertins | 5—331 |
| 3,021,534 | 2/62 | Hausted | 5—331 |

FOREIGN PATENTS 16,022  9/92  Great Britain.

FRANK B. SHERRY, *Primary Examiner.*